United States Patent [19]

Tanaka et al.

[11] Patent Number: 5,523,861
[45] Date of Patent: Jun. 4, 1996

[54] IMAGE READER CAPABLE OF SETTING DENSITY AND ILLUMINATION

[75] Inventors: Kazuki Tanaka; Takayuki Ishihara, both of Yokohama, Japan

[73] Assignee: Canon Kabushiki Kaisha, Tokyo, Japan

[21] Appl. No.: 882,571

[22] Filed: May 13, 1992

[30] Foreign Application Priority Data

May 15, 1991 [JP] Japan ................................. 3-110347

[51] Int. Cl.⁶ .................................................. H04N 1/04
[52] U.S. Cl. .......................... 358/475; 358/447; 358/461
[58] Field of Search ...................... 358/474, 475, 358/447, 75, 76, 80, 509, 510, 461, 464; 355/228, 229; 382/274; H04N 1/04

[56] References Cited

U.S. PATENT DOCUMENTS

| | | | |
|---|---|---|---|
| 4,341,463 | 7/1982 | Kashiwagi et al. | 355/14 CH |
| 4,627,703 | 12/1986 | Suzuki et al. | 355/3 R |
| 4,700,237 | 10/1987 | Yoshioka et al. | 358/287 |
| 4,720,707 | 1/1988 | Konishi et al. | 340/792 |
| 4,802,107 | 1/1989 | Yamamoto et al. | 358/527 |
| 4,888,492 | 12/1989 | Arimoto | 358/461 |
| 4,891,692 | 1/1990 | Outa | 358/75 |
| 4,893,180 | 1/1990 | Shigaki et al. | 358/80 |
| 4,953,013 | 8/1990 | Tsuji et al. | 358/80 |
| 4,980,760 | 12/1990 | Hiratsuka et al. | 358/80 |
| 4,989,099 | 1/1991 | Koshiyouji et al. | 358/487 |
| 4,992,864 | 2/1991 | Akiyama | 358/80 |
| 5,014,332 | 5/1991 | Nakajima et al. | 358/466 |
| 5,024,736 | 4/1993 | Abe | 358/80 |
| 5,136,402 | 8/1992 | Nagano | 358/483 |

FOREIGN PATENT DOCUMENTS

| | | |
|---|---|---|
| 0267793 | 5/1988 | European Pat. Off. . |
| 0267805 | 5/1988 | European Pat. Off. . |
| 55-161465 | 12/1980 | Japan . |
| 3150977 | 6/1991 | Japan . |
| 3160877 | 7/1991 | Japan . |
| 2207023 | 1/1989 | United Kingdom . |

*Primary Examiner*—Kim Yen Vu
*Attorney, Agent, or Firm*—Fitzpatrick, Cella, Harper & Scinto

[57] ABSTRACT

An image reader sets the level of illumination provided by a light source and the gamma correction provided by a density correction circuit in dependence upon a user selected density setting button on a control panel.

16 Claims, 10 Drawing Sheets

FIG. 6
FIG. 7
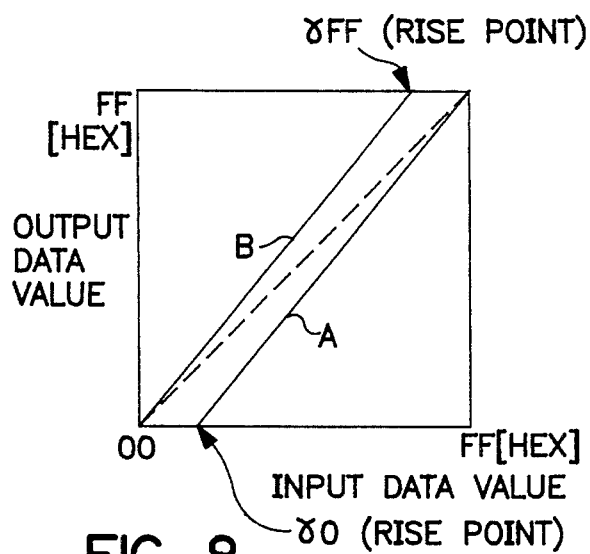
FIG. 8
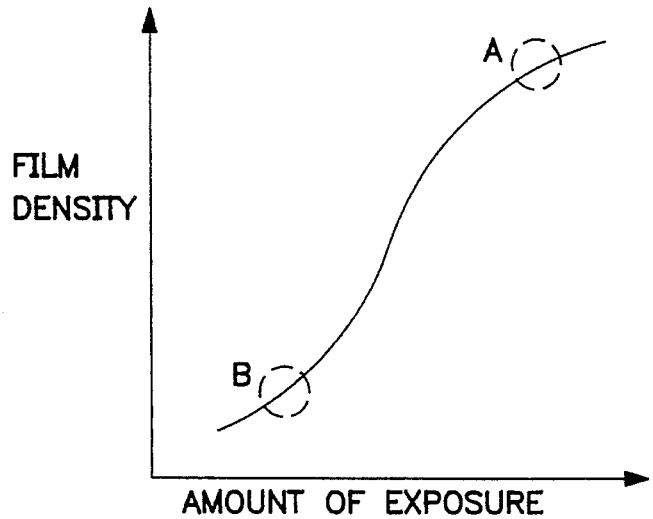
FIG. 9

IMAGE READER CAPABLE OF SETTING DENSITY AND ILLUMINATION

BACKGROUND OF THE INVENTION

1. Field of the Invention

This invention relates to an image reader for image processing and, more particularly, to an image reader for reading characters or images and generating a corresponding digital image signal (e.g. a digital scanner or a digital copier). Such image readers comprise a light source for exposing an image to light, and an image sensor (e.g. a CCD image sensor) for generating a corresponding image signal, and means for digitizing the image signal and digitally processing the digitized image signal.

2. Description of the Prior Art

A digital image reader is disclosed in our European Patent 0267793B granted to the present Asignee. In a reader of this type, an image of characters or pictures written or drawn on pages of a book, or some other document, or alternatively recorded on a microfilm or other transparent medium, is read using a CCD image sensor to provide an image signal which is then either recorded, processed or transmitted.

One example of an image reader is arranged to read an image from microfilm, and to print a corresponding output copy, and comprises a CCD image sensor or the like, means for electrically processing the image sensor output, and means for providing a digital signal to a printer unit such as a laser beam printer to obtain a copy. FIG. 14 is a block diagram of an image reader provided within such a reader/printer apparatus. In FIG. 14, reflected light from an original placed on, for example, an original table or light projected through a microfilm, is scanned by an image pick-up section 21 comprising an image pick-up device such as a CCD, and is converted into an electrical signal which is quantized into a multi-valued signal by an A/D conversion section 22. Multi-level quantized data thereby obtained is corrected by a gamma correction section 29 to take account of the difference between the photo-electric conversion characteristic of the image pick-up device in the image pick-up section 21 and the human gradation perception characteristic, illustrated in FIGS. 15, 16 and 17.

FIG. 15 shows an example of the photo-electric conversion characteristic of an image pick-up device (e.g. a CCD device). The abcissa represents a density scale which is linear with respect to the human gradation perception characteristic. It will be seen that the photo-electric conversion characteristics of image pick-up devices in general differ from the human gradation perception characteristic. For this reason, a gamma correction table embodying a correction characteristic such as that shown in FIG. 16 is used to provide density correction or density conversion, so that the output D' is linear with respect to the human gradation characteristic as shown in FIG. 17. The gamma correction characteristic is therefore essentially the reverse of the conversion characteristic of the image pick-up device with respect to the human gradation perception characteristic.

The signal processed by the gamma correction section 29 is converted, by a gradation processing section 25, into binary (bi-level) image data from which a graded image can be reproduced by, for example, a dither or error diffusion method, and the processed data is output from the reader for subsequent printing or other processing or transmission.

Microfilm images are provided either as negative images or positive images on corresponding negative or positive films, which are selectively used for different purposes. A known image reader enables either negative or positive films to be copied; in this reader apparatus an image from the film is directly projected onto a photo-sensitive member from which it maybe printed (e.g. electrostatically). This direct, or analog, type printer therefore has two separate image forming processes, one for negative film and one for positive film, and requires toners having different polarities and two different development devices, a changeover mechanism for interchanging between the two, a circuit or mechanism for changing the polarity of a high voltage output from a transfer charger or other charger, and two separate high voltage power sources for different load characteristics, and requires also a changeover for providing blanks for blank exposure. Analog type reader/printers of this type are proposed by the present asignee in U.S. Pat. No. 4,341,463 and U.S. Pat. No. 4,627,703. This type of apparatus can be used to provide images having good gradation characteristics (grey scale reproduction) by selecting the reproduction voltages for each of the positive and negative film processes so as to provide optimal gamma characteristics (exposure/density characteristics). However, since two separate developing processes and associated changeover mechanisms are required, the apparatus is necessarily undesirably complex.

Digital reader/printers (for example the Canon DMP100) are, on the other hand, less mechanically and electrically complex. In principle, such a reader/printer can be used to obtain a positive print copy from a film of either type merely by selectively inverting the digital signal output. However, if the digital signal is merely inverted in this way, it is not possible to obtain an image having good gradation characteristics. One of the reasons for this is that the gamma characteristic of a film is non-linear and, referring to FIG. 9, curved portions of the characteristic in the vicinity of A and B are not symmetrical.

Analog type reader/printers of this type are proposed by the present asignee in U.S. Pat. No. 4,341,463 and 4,627,703.

Thus, when a positive original is photographed onto a film, the portion A corresponds to a line drawing portion and the portion B corresponds to a background image portion whereas when a negative original is photographed onto the film, the portion B corresponds to the line drawing portion and the portion A corresponds to the background portion. Thus, if a reader/printer with a gamma correction characteristic set for one type of original is used to read and print the opposite type of original, by merely inverting the digital image data, the result is that line image portions receive the gamma correction appropriate for background portions and vice versa.

Japanese laid open applications nos. 3-150977 and 3-160877, and corresponding U.S. applications Ser. No. 604,955 filed on 25th Oct. 1990, all assigned to the present assignee and published after the present priority date, describe a reader/printer in which this problem is solved by providing means for selecting the gamma correction in dependence upon whether the film is a negative or positive original film.

In such a digital reader/printer, ordinarily, the signal from the image pick-up device is amplified and digitized, and a look-up data table is used for converting the digitized data to gamma corrected data, the look-up table operating in accordance with a linear or non-linear scale, which in either case does not have a one-to-one output characteristic.

In general, in the case of processing image data from a microfilm (or like transparent medium) the print density level required is found to depend not only on the non-linearity of the gamma characteristic of the film but also on the original type (positive or negative), the density characteristic of the original image (imaged by a camera), the resolution of the camera lens which imaged the original, the extent of defocus thereof, the kind of film (silver salt, diazo, vescicular and so on) the film developer liquid, the development conditions, and other factors, as well as the purpose and the user's preference.

SUMMARY OF THE INVENTION

In view of the foregoing, one object of the present invention is to provide means for reading an original image at a desired density.

Another object of the present invention is to suitably read an image recorded on a microfilm.

Another object of the present invention is to suitably read either positive or negative images as desired from a film or other type of original.

In one aspect, the present invention makes use of the inventor's discovery that particular gamma correction and light level combinations are preferable for each different film/image density setting. Accordingly, an image reader in this aspect of the invention varies the illumination level and the density correction jointly, in dependence upon an image control signal (typically a user selected density level).

In another aspect, the present invention provides an image reader which allows a continuously variable user adjustment of image density, in which the image density selected varies the density conversion applied, in such a way as to avoid sudden changes in the image appearance (such as the appearance fogging) with small changes in the selected image density. This is preferably achieved by providing that the density correction is progressive with varying user selected image density over a central or normal operating density range, and that the variation of density correction is reduced (for example held constant) outside this normal range.

In a preferred embodiment according to this aspect, the light level of illumination is also controlled over the density range; for example, the light level may vary more outside the normal range than inside so as to compensate the reduction in variation of density conversion characteristic.

Preferably, in either aspect, edge enhancement filtering is provided and very preferably this filtering can by varied (for example in dependence upon density, or upon film type).

The foregoing and other objects of the present invention, and the advantages thereof, will become further apparent from the following description in conjunction with the attached drawings.

BRIEF DESCRIPTION OF THE DRAWINGS

FIG. 6 is a diagram of a first example of an edge enhancement coefficient matrix for use in the embodiment of FIG. 1; and FIG. 7 is a diagram of a second example of such an edge enhancement coefficient matrix;

FIG. 8 is a diagram of the relationship between input image data values and output image data values in the embodiment of FIG. 1;

FIG. 9 is a diagram showing an example of the gamma characteristic of a film;

DESCRIPTION OF THE PREFERRED EMBODIMENTS

Figure 1:
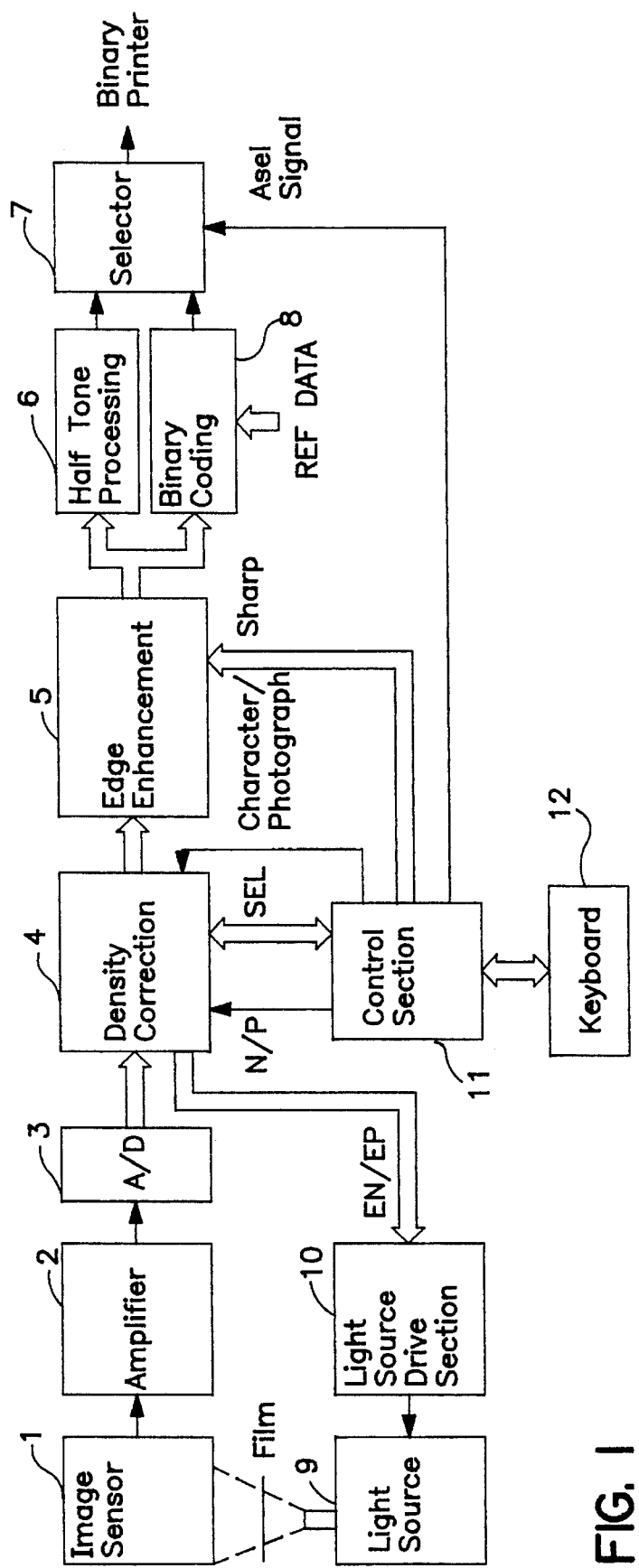
FIG. 1 is a block diagram of an embodiment of the present invention.

FIG. 1 is a block diagram of a reader/printer comprising one embodiment of the present invention, The reader/printer comprises an image sensor 1 (e.g. a CCD device, or any other suitable image pick-up sensor) for reading an enlarged projected image of a microfilm, an amplifier 2 connected to the output of the image sensor 1 for generating an amplified analog image signal, an A/D converter 3 connected to the amplifier 2 for converting the analog signal into a digital signal, a density correction circuit 4 connected to receive the digital signal as input data and to provide corrected output signal data in accordance with a predetermined gamma correction curve, an edge enhancement circuit 5 comprising a digital filter for converting the digital image signal into an edge enhanced digital signal, a pseudo half-tone processing circuit 6 for processing a digital signal so as to provide a pseudo half-tone output (e.g. by using an error diffusion method well known in the prior art), a binarizing circuit 8 which thresholds multi-level image data in accordance with threshold reference data, and a selector circuit 7 for selecting either the binary coding circuit 8 or the half-tone processing circuit 6, for routing to, for example, a binary printer.

The reader/printer also comprises a light source 9 such as a halogen lamp, for illuminating a microfilm for reading by the image sensor 1, and a light source drive circuit 10 for controlling the quantity of light emitted by the light source 9 by controlling the electric power for energizing thereof, according to digital light quantity data EN or EP. The light source 9 may be as described in EP0267793, for instance.

A control unit 11 (for example, a microcomputer unit comprising a microprocessor and associated ROM and RAM storage) is connected to a control panel 12 to receive control signals provided by a user operating the control panel 12, and is connected to provide control data to the density correction circuit 4, the edge enhancement circuit 5 and the selector 7.

In operation, the reader/printer illuminates a microfilm via the light source 9, and an enlarged projected image of the microfilm is scanned line by line by the image sensor 1 to provide a line by line analog serial image signal which is amplified by the amplifier 2 to a suitable range to provide a signal input to the A/D converter 3. The amplifier 2 may also provide any offset voltage adjustments required.

The analog signal input to the A/D converter 3 is converted into a multi-bit (for example 8 bit) digital signal between 0–255 (hexFF) coupled to the input of the density correction circuit 4.

Density Correction Circuit 4

Figure 2:
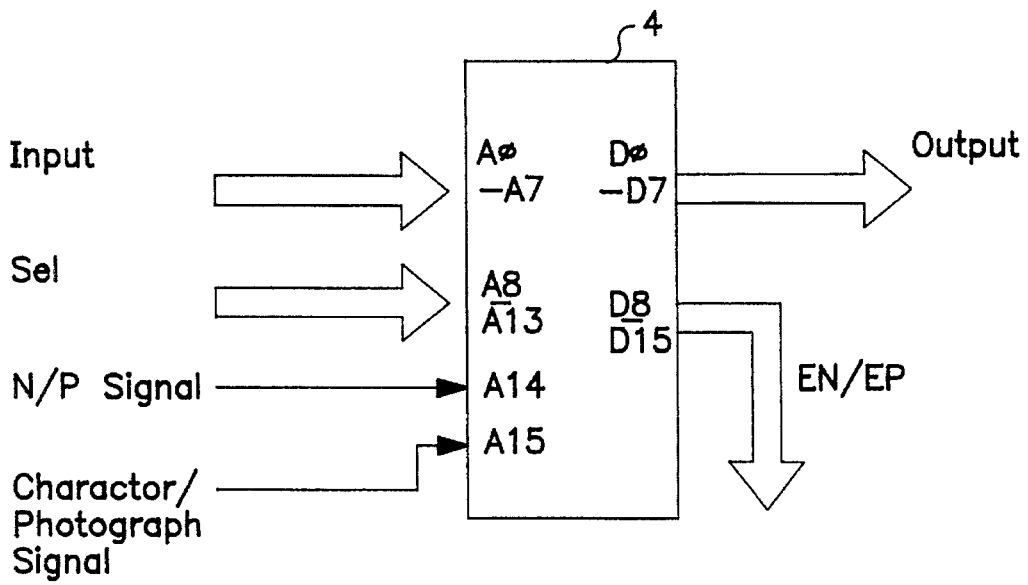
FIG. 2 is a diagram showing the structure of an example of a gamma correction circuit suitable for the embodiment of FIG. 1.

The circuit 4 comprises, for example, a look-up table ROM as shown in FIG. 2; in this case the input signal is coupled to the address lines of the ROM density correction circuit 4, and an output signal is extracted from the data bus terminals D0–D7 thereof.

Also provided from the density correction circuit 4 (as an output thereof) is the light quantity data EN-EP to drive the light source drive circuit 10.

Also coupled to the input (address) lines of the density correction circuit 4 is a multi-bit characteristic selection signal SEL (for example a 5 bit signal), a single bit signal (N/P) indicating. Whether the microfilm represents a positive or negative original, and a single bit signal indicating whether the microfilm image is a character image or a photograph image.

The density correction controlling signals SEL, N/P and character/photograph are supplied, as discussed in greater detail below, in dependence upon controls on the control panel 12.

FIG. 8 shows the relationship between input data values and output data values from the density correction circuit 4. The density correction circuit 4 provides an output data value which is related to the input data value by a gamma correction curve. FIG. 8 shows two types of gamma correction curves. A first type (labelled "A") is used with negative original films. In this case, the gamma correction curve runs between an upper point with coordinates hex (FF,FF) and a lower point with coordinates $(\delta_0, 0)$. Thus, when the film contains an original negative image, the range of input data values between $\delta_0$ and FF is expanded to an output data range of 0–FF, and low input data values are suppressed.

The curve B is defined by an upper point $(\delta_{FF}, FF)$ and a lower point $(0,0)$, and corresponds to a positive original film. In this case, input data values between 0 and $\delta_{FF}$ are expanded to fill the output data range between 0 and FF, and high input data values are clipped to FF. As shown, the gamma correction curves may be linear, or could be non-linear functions defined by the corresponding point $\delta_{FF}$ or $\delta_0$ ("rise points").

The density correction circuit 4 embodies a plurality of different density conversion characteristics of the type illustrated in FIG. 8; a first subset being for use with N type films and a second Subset for use with P type films. The characteristic curve which is selected for processing the image signal depends upon the control signals input to the density correction circuit 4; the N/P signal selects whether a characteristic of the type "A" corresponding to a negative film or of the type "B" corresponding to a positive film is selected, and the SEL signal (and optionally the character/photograph signal) selects the value of the rise point defining the slope (and hence the input data value range) of the gamma correction applied by the density correction circuit 4.

As mentioned above, the amount of light emitted by the light source 9 is also controlled in accordance with same control signals N/P, SEL and, optionally, character/photograph; conveniently the light quantity EN/EP is supplied from the output of the density correction circuit 4.

Figure 3:
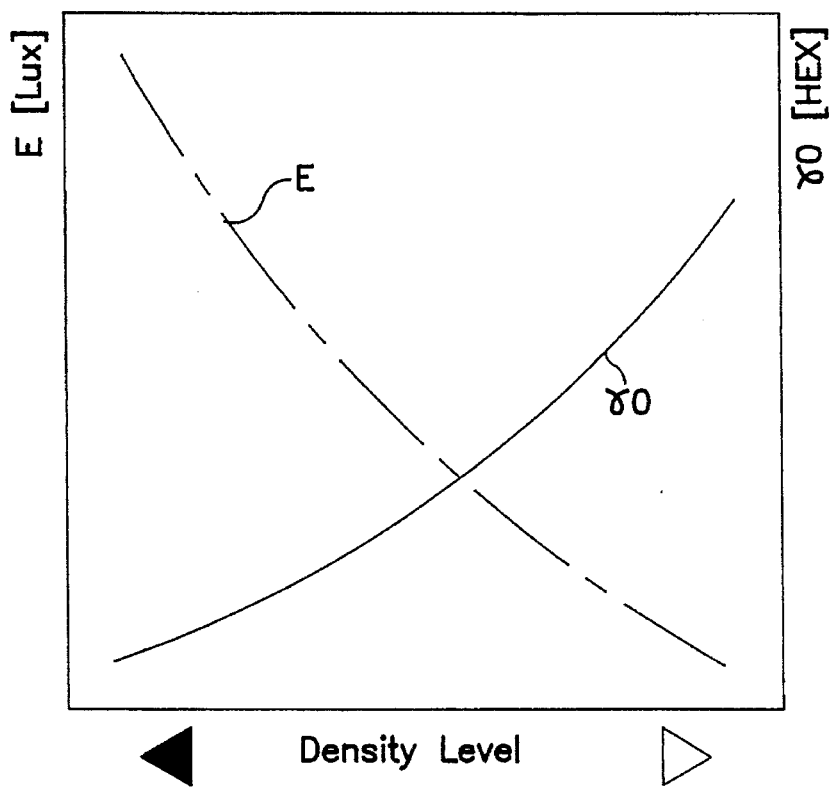
FIG. 3 is a diagram showing examples of gamma characteristic curves for a negative original film.
Figure 4:
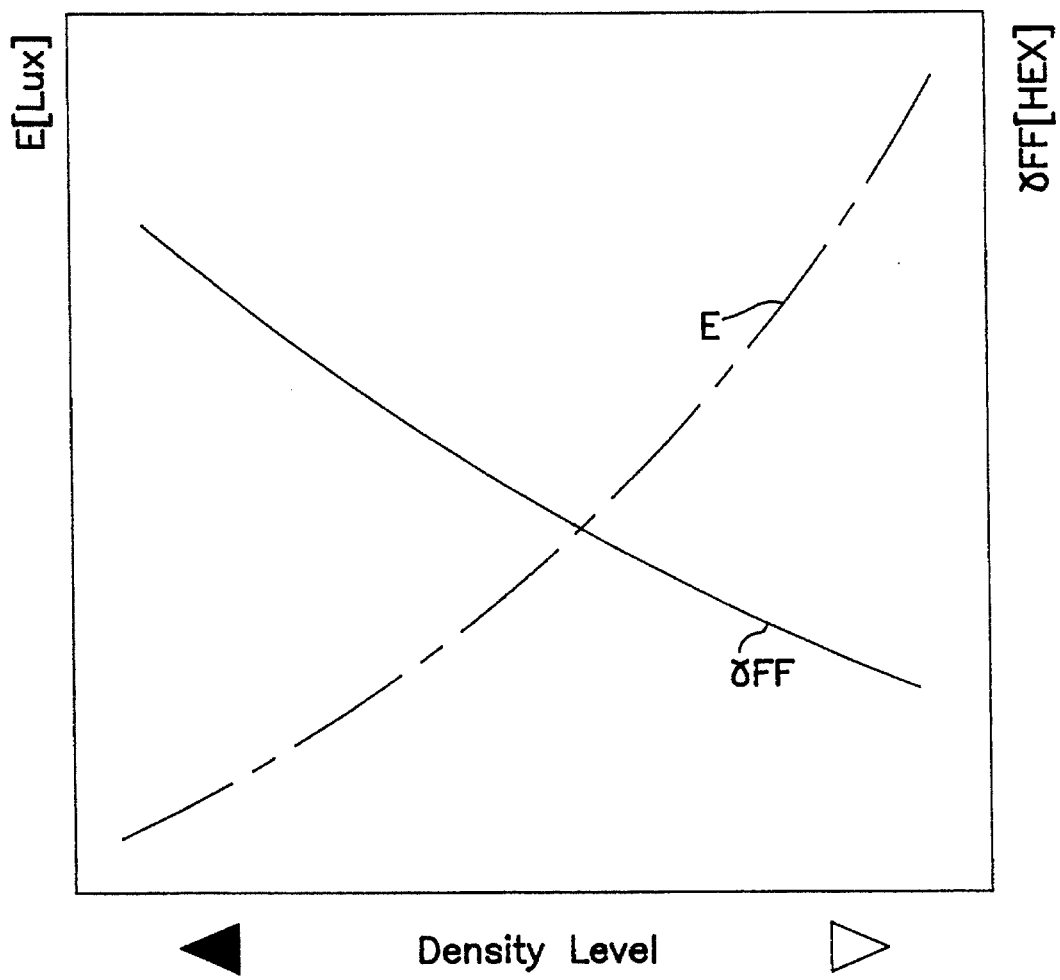
FIG. 4 is a diagram showing examples of gamma characteristic curves for a positive original film.

FIG. 3 shows, for a negative film with a character image, the variation of $\delta_0$ (defining the slope of the gamma correction applied by the density correction circuit 4) and the light level E to be applied by the light source 9, in dependence upon the density level selected by the operator from the control panel 12. FIG. 4 correspondingly shows a curve of rise point and light level E for a positive film. Data corresponding to FIGS. 3 and 4 is stored in the density correction circuit 4 and is accessed by the SEL signal to vary the light level and gamma correction selected in dependence upon the density levels selected by the user.

Control Panel 12

Figure 5:
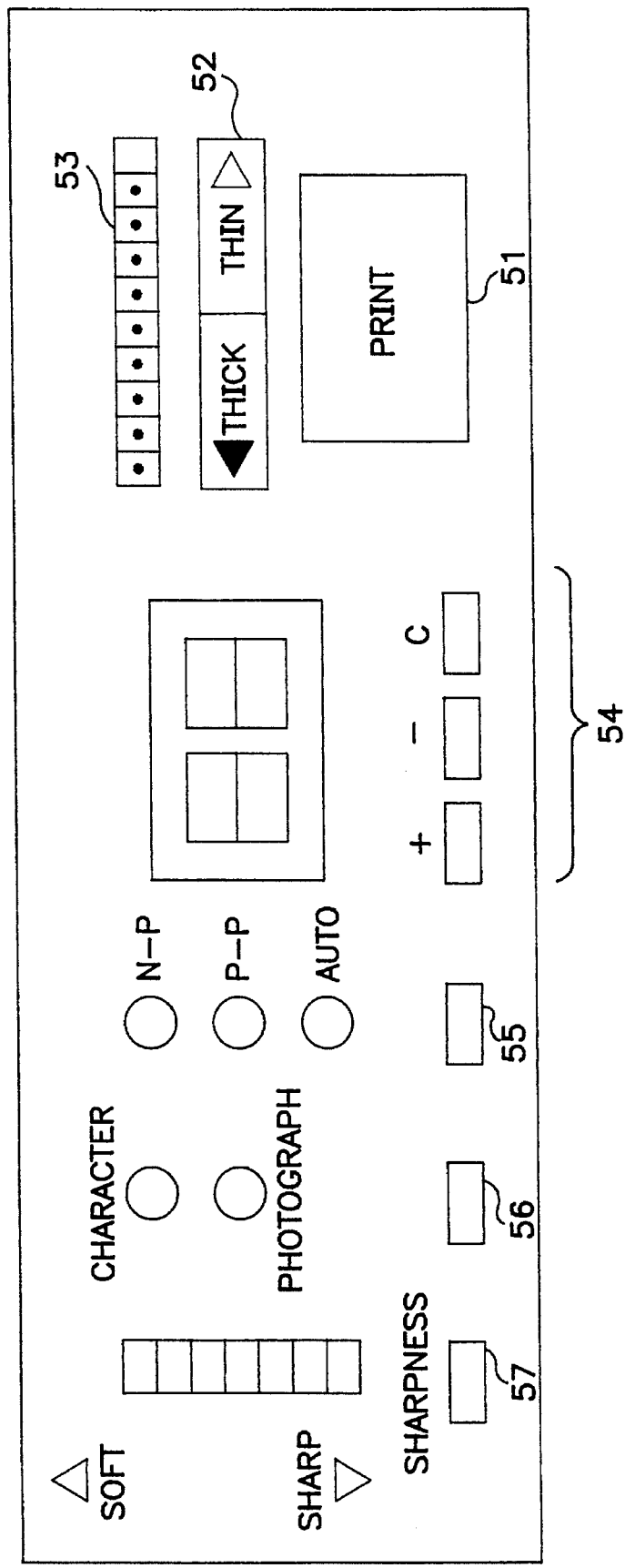
FIG. 5 illustrates schematically the arrangement of a control panel suitable for use in the embodiment of FIG. 1.

FIG. 5 is a diagram of the construction of the control panel 12. The control panel comprises, from the right hand side, a print button 51 for initiating printing; print density selection buttons 52 and an associated LED indicator array 53, so that the operator can increase or reduce the print density ("thick" and "thin" respectively), print run number setting buttons 54 for increasing, reducing or cancelling the number of prints selected; a film type selection button 55 and associated indicator lamps, for selecting between negative originals, positive originals or automatic original selection; a character/photograph selection button 56 for selecting either character or photograph mode, and associated indicators; and a sharpness selection button 57 and associated indicators for selecting the sharpness of reproduction of the image. The state of the buttons is selected by the operator according to preference. The outputs of the buttons are connected to the control unit 11, which monitors the button states and sets corresponding print density level data (SEL), sharpness data (SHARP), character/photograph indication data and negative/positive original data (N/P).

Edge Enhancement Section 5

Referring back to FIG. 1, the digital signal output from the density correction circuit 4 is input to the edge enhancement circuit 5 and is processed by digital filtering using a Laplacian convolution (3×3) mask shown in FIG. 6, for example. The mask can be seen to execute two dimensional high pass spatial filtering. The degree of edge enhancement depends upon the mask coefficients shown in FIG. 6, and the degree of edge enhancement is varied by varying sharpness data $\alpha$ in accordance with the sharpness selected by the button 57 on the keyboard 12; the edge enhancement circuit 5 therefore permits the varying of the Laplacian convolution mask coefficients. The mask need not, of course, be a 3×3 mask; it may be a 5×5 pixel mask, for example. Likewise, diagonal filtering coefficients may also be present as shown in FIG. 7. The edge enhancement circuit 5 therefore comprises line buffer or picture buffer means for retaining the two dimensional coefficients of neighboring lines and arithmetic means for performing the convolution.

The edge enhancement circuit 5 could provide a fixed degree of edge enhancement (although this is not a preferred embodiment). The edge enhancement circuit 5 could comprise a plurality of edge enhancement stages, to increase the degree of edge enhancement.

In a preferred embodiment, the degree of edge enhancement is changed according to whether the film is a positive or negative original film, as disclosed in the above referenced Japanese laid open applications and U.S. unpublished application. The reason for this is that dust, extraneous material, scratches or the like have an image density close to that of line image portions in the case of a positive film, and are hence more noticeable if the degree of edge enhancement is increased, whereas in a negative film the density of such unwanted or extraneous image portions is closer to that of the background and consequently is less noticeable even at higher degrees of edge enhancement; accordingly a higher degree of edge enhancement is preferred if the film has a negative original, and the sharpness data $\alpha$ is changed accordingly in dependence upon the negative/positive data generated by the control unit 11.

The sharpness of the film also varies according to the nature of the original prior to recording on the film; the resolution of the camera lens which imaged the original onto the film; the extent of defocus; the kind of film; and development materials and conditions, and accordingly the sharpness control button 57 on the control panel 12 permits the user to continuously vary the degree of sharpness (i.e. the magnitude of the coefficients of the Laplacian convolution mask) to suit the user's preference.

The degree of edge enhancement is preferably also selected depending upon whether the image is a character image or a photograph image, as selected by the button 56 on the control panel 12. In the photograph mode, the Laplacian convolution mask coefficients are set to be about half of their value in the character mode, so as to increase the gradation effect, by changing the sharpness data $\alpha$.

Half-Tone Processing Circuit 6

The signal, edge enhanced by the edge enhancement circuit 5, is input to the half-tone processing circuit 6 and, in parallel, the binary coding circuit 8 for processing by pseudo half-tone processing or sample binary coding. Preferably, the half-tone processing circuit 6 comprises an error diffusion circuit. In such a circuit, the density of each pixel is compared with a certain predetermined threshold value, and the error between the two is diffused to neighboring pixels, to affect the density of the neighboring pixels. For example, the target pixel may be quantized to the predetermined threshold value, and predetermined portions of the quantizing error added to the neighbouring pixels. This method as is typical of pseudo half-tone processing methods, which also include, for example, dither quantization methods.

Binary Coding Circuit 8

The binary coding circuit 8 compares each multi-level (e.g. 8 bit) pixel Signal with predetermined reference data (representing a threshold level) and generates a corresponding binary pixel output (e.g. depending upon whether the multi-level pixel data is greater or less than the predetermined threshold).

Mode Selector Circuit 7

The mode selector circuit 7 selectively passes either the output of the half-tone processing circuit 6 or the binary coding circuit 8 to an output port for connection to a binary printer or other binary output device, under control of the ASEL signal from the control unit 11. A half-tone processed image has an improved gradation characteristic to the human viewer, and this effect is particularly high in a case of a photographic image. It is also possible to provide a density difference between thick and thin characters in the case of a line image. However, the effect of pseudo half-tone processing in a binary printer (in which on-off dots are determined according to a binary input signal, and all dots have a uniform density) reduces the spatial resolution of the image slightly, and it is therefore preferable to inhibit the half-tone processing when the film image is comprised only of lines (e.g. as a character image). The control unit 11 is therefore arranged to select either half-tone processing, or binary coding, via the selector unit 7, in response to operation of the character/photograph selection button 56 on the keyboard by the user.

Deriving the Gamma Correction Data

The process by which the gamma correction data used in the density correction circuit 4 was derived by the inventors will now be described.

The rise points $\delta_0$ and $\delta_{FF}$ which are illustrated on FIG. 8 and are plotted in FIGS. 3 and 4 will first be described. The rise points are related to density levels of the film image which can be used to separate the image from the noise level of the background. $\delta_0$ for a negative film is a low value near the background level, so that background noise density variations are cut or suppressed (portion B of the curve of FIG. 9) whilst image portions are reproduced with suitable fidelity (portion A of FIG. 9). Likewise, for a positive original, $\delta_{FF}$ is a high density level close to the background density level, so that background noise above this level is cut whilst reproducing image data below this level.

In FIG. 8, the gamma correction curve is shown as a straight line connecting 00 and the rise point (for a positive film) or FF and the rise point (for a negative film). The slope of the density correction curve varies if the rise point value varies, and thus a suitable image can be obtained by a user by changing the rise point, according to the kind of film and user selected density. The straight line correction curves shown in FIG. 8 are provided as an aid to Understanding. If the A/D converter 3 provides a logarithmic conversion, as in some types of known image processing apparatus, this linear curve can suitably provide gamma correction of the logarithmic A/D output. If the input data is not non-linearly converted in this way, however, the gamma correction curves shown in FIG. 8 are preferably non-linear (e.g. generally exponential) in shape but, as described above, are defined by the rise points and either 00 or FF.

Figure 10A:
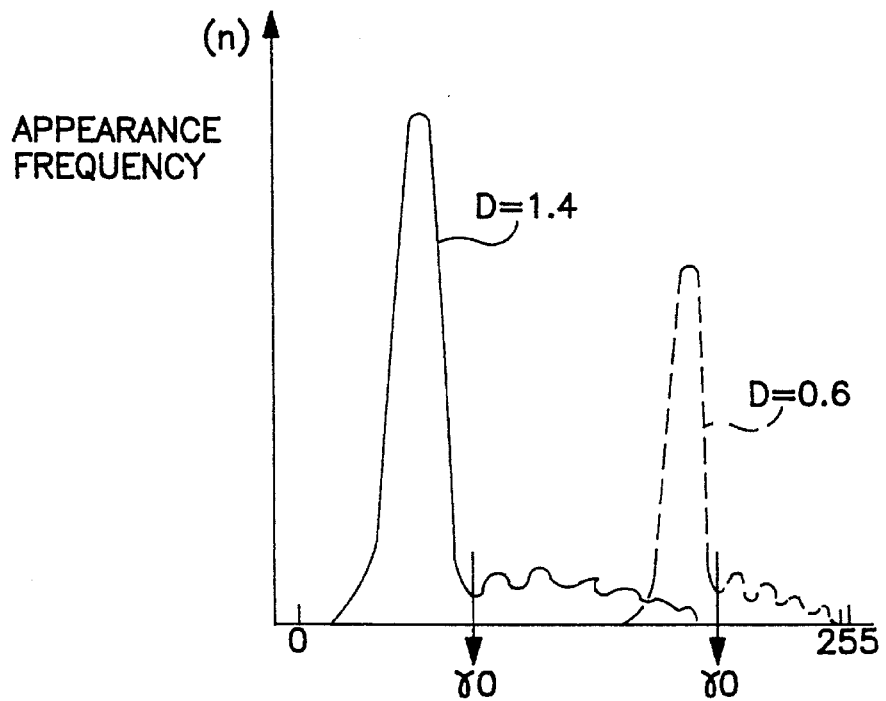
FIGS. 10a and 10b are examples of density histograms derived from negative and positive original films respectively.
Figure 10B:
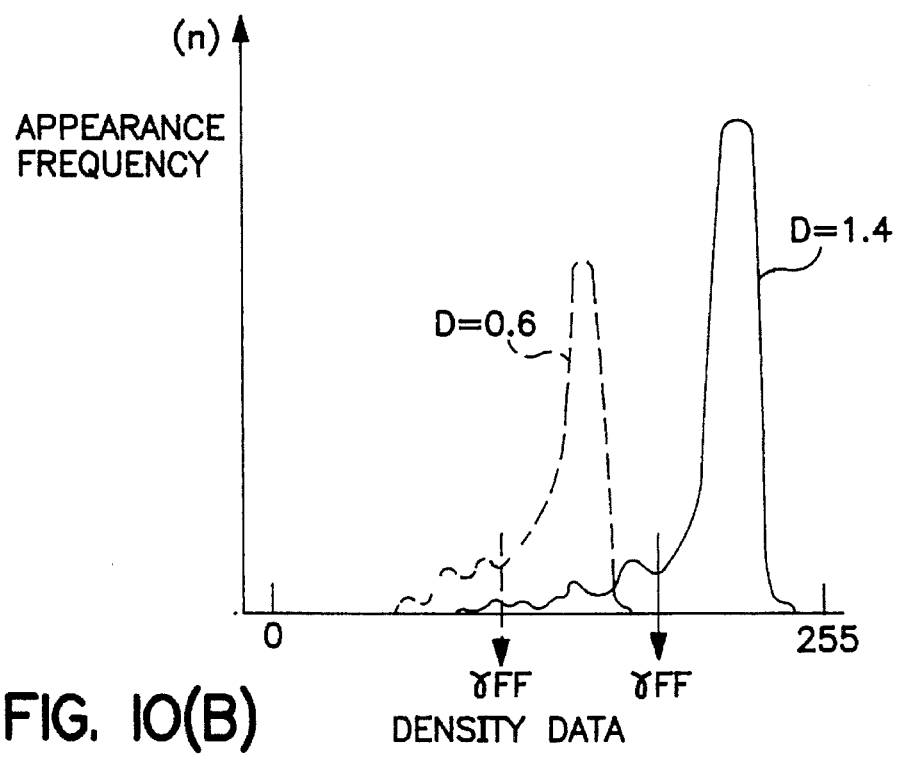

FIG. 10(A) is a diagram showing the frequency (n) of appearance of data of each density level on a negative film on which a character image is provided, and FIG. 10(B) is a corresponding diagram showing the frequency (n) of occurrence of image density levels on a positive film; in other words, these diagrams are density histograms. In each case, the film has a predetermined base density D and is illuminated with light of a predetermined level.

In FIG. 10(A), for a negative film, the solid line indicates the density histogram for a film of transmission density D=1.4 with respect to the background portion, and the broken line indicates a film in which the transmission density D is 0.6, and the solid and broken curves in FIG. 10b correspond.

It will be seen that in each case, a higher peak corresponds to background data, and lower peaks correspond to the image (character) portion of the film. In the case of the negative film illustrated in FIG. 10(A), the rise point $\delta_0$ is set to a point approximating to the inflection point between the background portion and the character portions of the histogram, and likewise the rise point $\delta_{FF}$ is set at this inflection point in the positive film of FIG. 10(B).

Figure 11A:
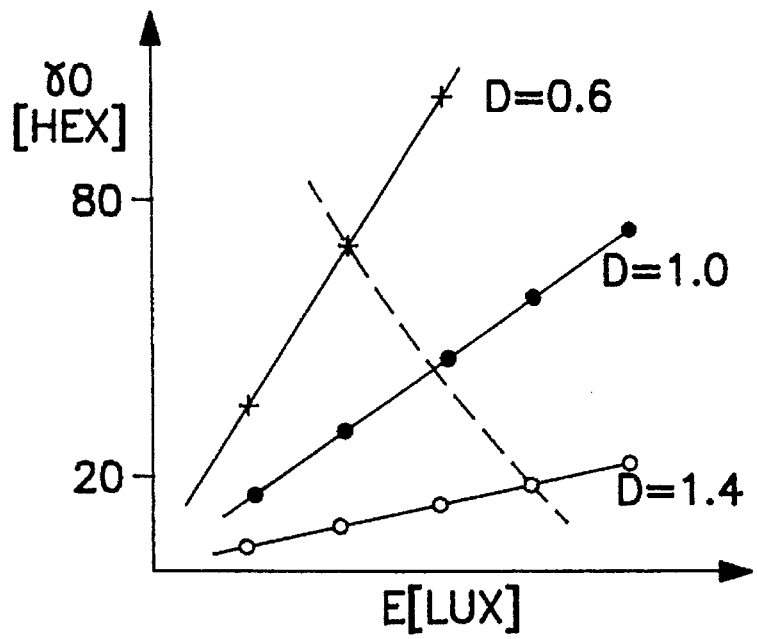
FIGS. 11a and 11b are diagrams of the relationship between light output quantity and gamma correction data for negative and positive films respectively.
Figure 11B:
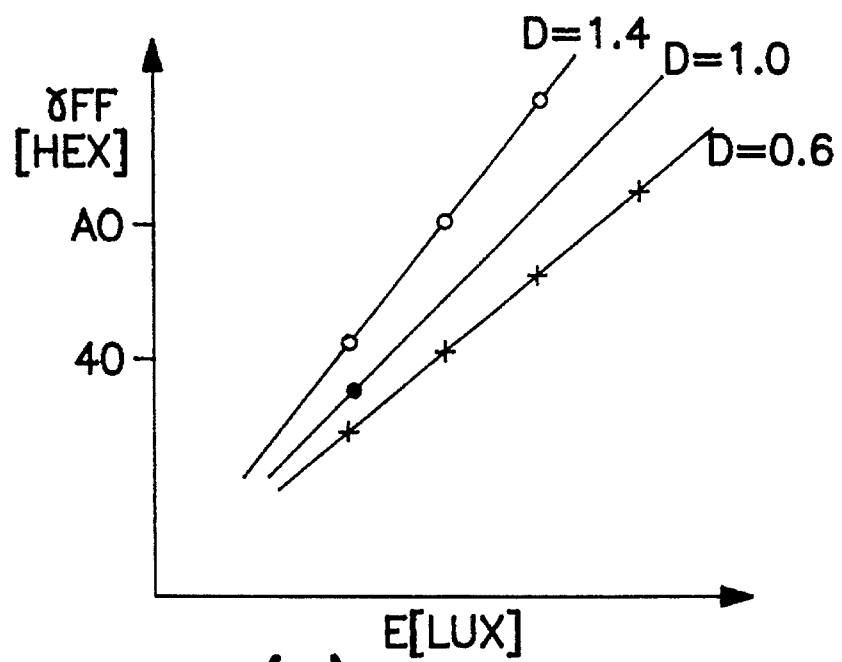

FIGS. 11(A) and 11(B) show the variation of the rise point values with amount of light with which the film is illuminated, in the case of films of different transmission densities D. It will be seen that in each case the rise point varies monotonically with increasing light level. In each of FIGS. 11(A) and 11(B), the abelsea represents the quantity of light E (LUX) and the ordinate represents the value of the rise point; $\delta_0$ in FIG. 11(A) for the negative image and $\delta_{FF}$ for the positive image in FIG. 11(B). The curves shown in FIG. 11(A) and 11(B) were derived by using a plurality of different evaluation test figures photographed on microfilm, including typed characters, characters written with a pencil, gradation step frames having densities from solid black to half turn, and a mixture of different types of characters such as thin and thick line characters.

In FIGS. 11(A) and 11(B), firstly, rise points are determined from density histograms of the types shown in FIG. 10(A) and 10(B) for each of a plurality of different light levels, for each of several different film densities (D=0.6–D=1.4).

In each case, however, one particular light level is found, by human inspection, to give the best reproduction, and from inspection of FIGS. 11(A) and 11(B), this optimum light level and rise point combination is indicated as the intersection of the dashed line with each of the rise point curves corresponding to different film base densities. Data values of optimum rase point $\delta_0$=70 hex, 48 hex and 20 hex are obtained for films of base-densities D=0.6, 1.0 and 1.4, respectively, in the case of the negative film of FIG. 11a, and values of $\delta_{FF}$=60 hex, 70 hex and 90 hex for films of D=0.6, 1.0 and 1.4 respectively are obtained in the case of the positive film of FIG. 11(B).

Referring now to FIGS. 3 and 4, on these figures the density level setting F set by the density control buttons 52 on the control panel 12 is plotted as the abcissa and the optimum light quantity E and optimum rise point $\delta$ are plotted as the ordinate, being shown as a chain—dash line and a solid line respectively. FIG. 3 is a plot for a negative original image, and FIG. 4 is a corresponding plot for a positive original image.

The black triangle corresponds to that on the control panel 12 and indicates the direction in which density increases whereas the white triangle indicates the direction in which density decreases.

To derive FIGS. 3 and 4, the film base density values D=0.6, 1.0 and 1.4 are converted to a print density scale F, and for each film base density the corresponding rise point $\delta 0$ or $\delta FF$, and light level E are plotted. The light level E in FIG. 3 for a negative film is denoted EN, and the light level E in FIG. 4 for a positive film is denoted EP.

It will be seen from FIG. 3 that for a negative film, the rise point $\delta_0$ decreases with increasing density level whereas the light required E rises with increasing density level; likewise it will be seen from FIG. 4 that the rise point $\delta_{FF}$ increases with increasing density level whereas the light level decreases.

After the curves of FIGS. 3 and 4 have been derived, data corresponding to the rise point curve and the light level curve in each figure is tabulated as shown in Table 1 for storage in the density correction circuit 4.

Table 1 illustrates the combined data shown in FIGS. 3 and 4, in an exemplary form in which it may be stored in the density correction 4. The value F represents the image density set by the density selection button 52 on the control panel. The density increases towards F1 and reduces towards F33. EN and EP, as discussed above, represent respectively the optimum light level for negative and positive originals, in hexadecimal notation. $\delta_0$ and $\delta_{FF}$ represent the rise points respectively for a negative and a positive film in hexadecimal notation. It will be seen that EN and EP are reverse—symmetrical; EN varies logarithmically with F from a higher value at F1 to a low value at F33, whereas EP varies logarithmically in the reverse sense. Thus, for a given user selected density level F and original type N-P, a unique pair of rise point (defining the gamma correction curve) and light level settings are derived from the look-up table corresponding to Table 1 and employed to operate the image reader.

| F | EN | $\gamma O$ | EP | $\gamma FF$ |
|---|----|----|----|----|
| 1 | B5 | 14 | 0F | A0 |
| 2 | AA | 15 | 12 | 9E |
| 3 | A0 | 17 | 14 | 9C |
| 4 | 97 | 18 | 16 | 99 |
| 5 | 8E | 1A | 18 | 97 |
| 6 | 86 | 1C | 1B | 95 |
| 7 | 7E | 1E | 1D | 93 |
| 8 | 76 | 20 | 20 | 90 |
| 9 | 6F | 22 | 23 | 8E |
| 10 | 68 | 24 | 26 | 8B |
| 11 | 62 | 27 | 2A | 89 |
| 12 | 5C | 2A | 2D | 86 |
| 13 | 56 | 2D | 31 | 83 |
| 14 | 5D | 3D | 34 | 81 |
| 15 | 4B | 33 | 38 | 7E |
| 16 | 46 | 37 | 3D | 7B |
| 17 | 41 | 3A | 41 | 78 |
| 18 | 3D | 3F | 46 | 75 |
| 19 | 38 | 43 | 4B | 72 |
| 20 | 34 | 48 | 5D | 6F |
| 21 | 31 | 4D | 56 | 6C |
| 22 | 2D | 52 | 5C | 68 |
| 23 | 2A | 58 | 62 | 65 |
| 24 | 26 | 5E | 68 | 62 |
| 25 | 23 | 65 | 6F | 5E |
| 26 | 20 | 6C | 76 | 5B |
| 27 | 1D | 73 | 7E | 57 |
| 28 | 1B | 7B | 86 | 53 |
| 29 | 18 | 84 | 8E | 50 |
| 30 | 16 | 8D | 97 | 4C |
| 31 | 14 | 97 | A0 | 48 |
| 32 | 12 | A2 | AA | 44 |
| 33 | 0F | AD | B5 | 3F |

Second Embodiment

A suitable density correction process improving in handling for the user, based on the above-described experimental results in accordance with a second embodiment of the present invention, will be described below.

Figure 12:
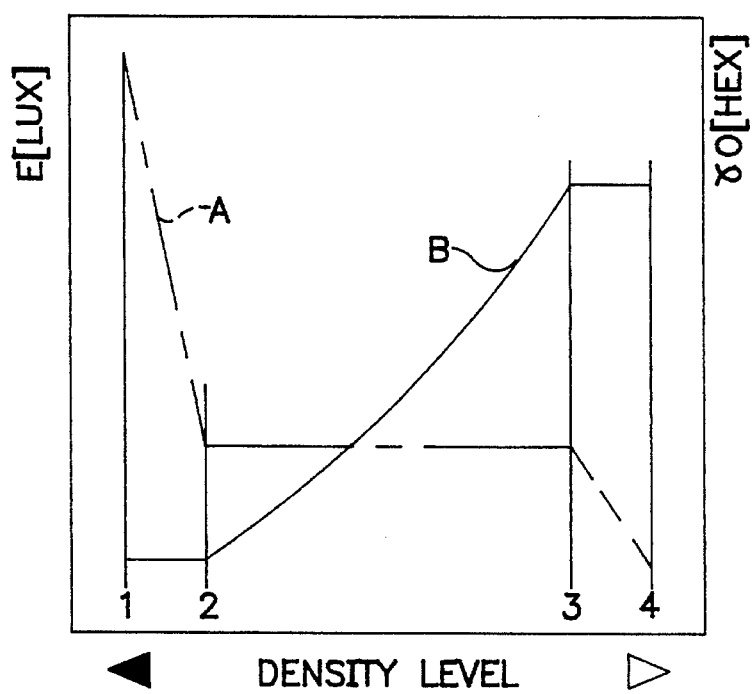
FIG. 12 corresponds to FIG. 4 in a second embodiment of the invention.

FIG. 12 shows $\delta$ characteristic curves of the second embodiment, improved from the $\delta$ characteristic curves for, in particular, negative films in accordance with the first embodiment. In the first embodiment, a wide-range arrangement with non-linear curves of FIGS. 3 and 4 is adopted to cover all films (densities, kinds, and so on) with respect to the density level variable range. However, the second embodiment is arranged by considering printing with fidelity in a central film density range of 0.8 to 1.2 in particular and ease of density control.

At present, a system including camera photographing techniques and film development techniques for forming films with a finished base portion density ranging from 0.8 to 1.2 has generally been established to provide laboratory services improved in terms of commercial value. There is therefore a problem of density control operability and image reproducibility with respect to the image output operation of outputting an enlarged film image to a printer.

Thus, the density dial operation is performed according to a user's preference. However, it is important for the image output to be free from fog, on the paper base portion, and to have the image density level stably maintained while preventing any abrupt density change (an abrupt increase in fog, an abrupt reduction in density, or the like) when the density dial 52 is changed by one step (density increasing or reducing direction) so as to bring the rise point into the fog level.

In FIG. 12, inflection points (2) and (3) of the dot-dash line A and the solid line B correspond to the film density range D=0.8 to 1.2, the inflection point (2) corresponding to the limit 1.2 and the inflection point (3) corresponding to the limit 0.8. The region (1)–(2) is set to cover film densities higher than 1.2, and the region (3)–(4) is set to cover film densities lower than 0.8.

That is, the density dial operation is performed according to the user's preference, and an image output can be obtained without fog on the paper base portion while the image density level is stably maintained. Also an abrupt density change (an abrupt increase in fog, an abrupt reduction in density, or the like) can be prevented when the density dial 52 is changed by one step (density increasing or reducing direction). Over the density region 0.8 to 1.2, the rise point is varied depending on the user density setting from the control 52. Outside this range, the rise point is held constant and instead the light level E is varied to change the density. If a fine control is required according to user's preference, the density dial can thus be moved by one step to suitably change the density without the sudden appearance of fog.

Figure 13:
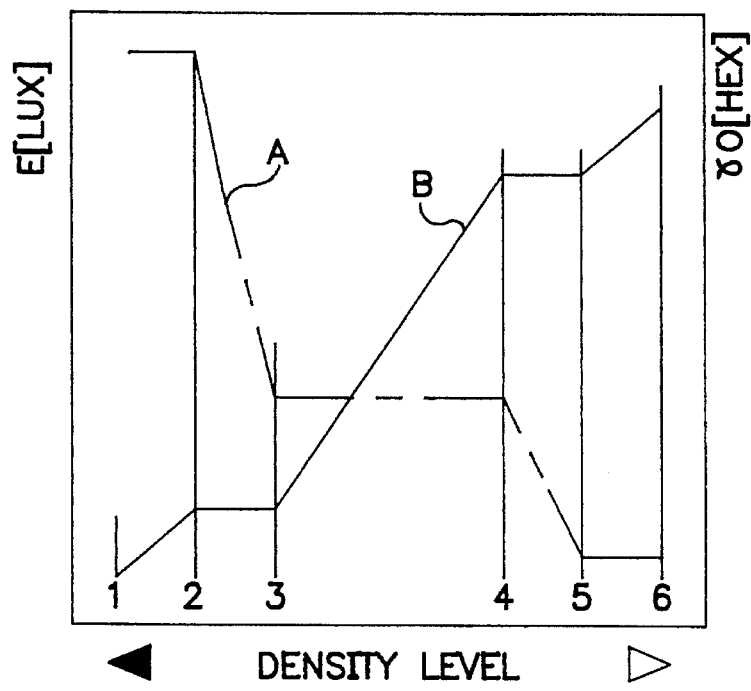
FIG. 13 corresponds to FIG. 12 in a third embodiment of the invention.
Figure 14:
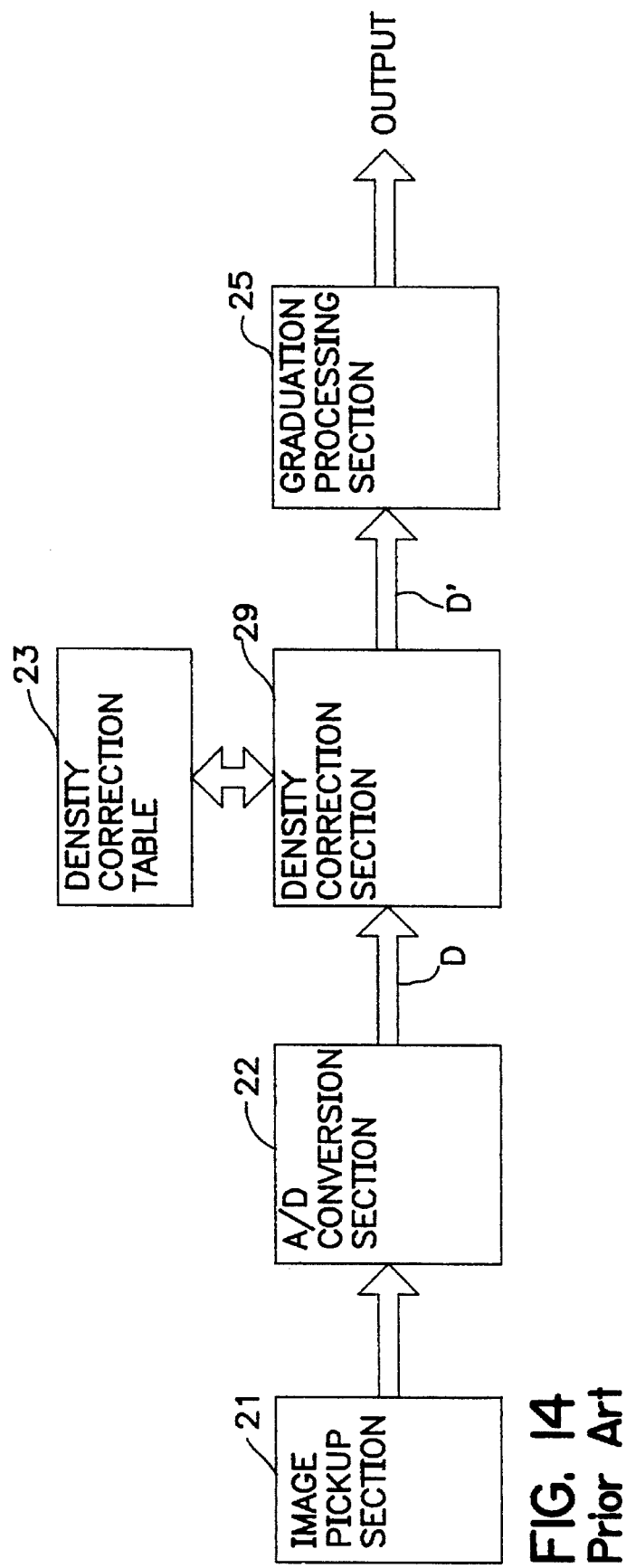
FIG. 14 is a block diagram of a known image processing unit.
Figure 15:
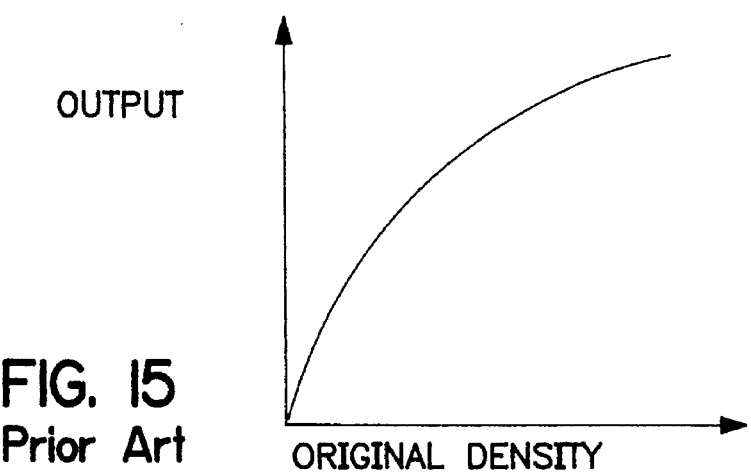
FIG. 15 is a diagram illustrating schematically the relationship between image density and image sensor outputs.
Figure 16:
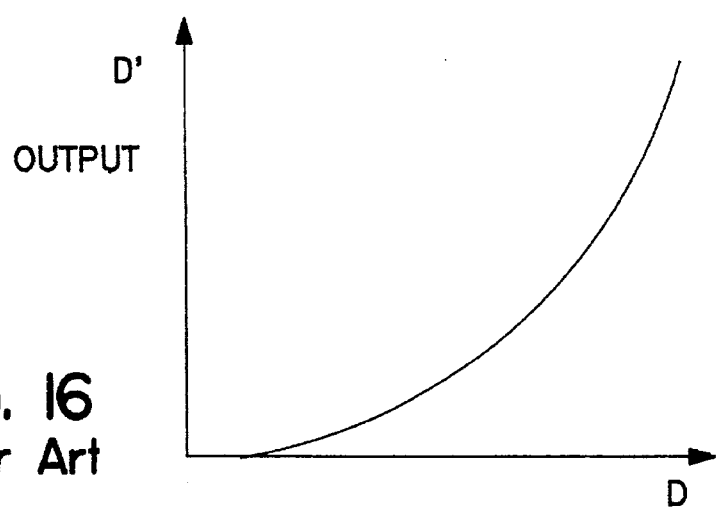
FIG. 16 is a diagram illustrating schematically the characteristic for gamma correction of FIG. 15.
Figure 17:
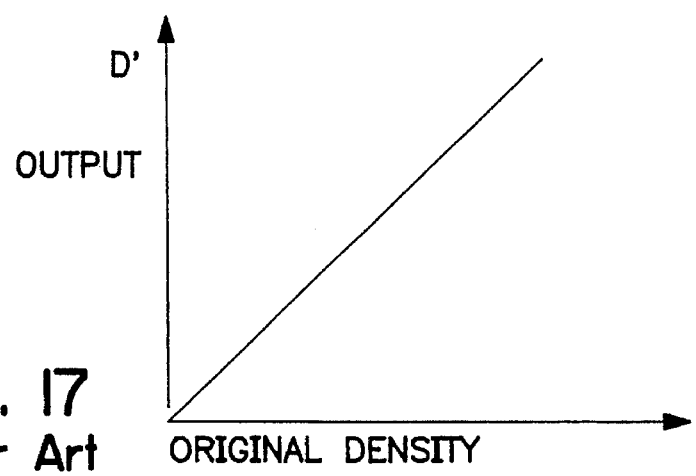
FIG. 17 illustrates the relationship between image density and output data following the correction of FIG. 16 in combination with the characteristic of FIG. 15.

FIG. 13 corresponds to FIG. 12 and shows δ characteristic curves of a third embodiment arranged to suitably process data from films having a finished film density distribution which is considerably one-sided on the high-contrast side or low-contrast side.

At present, a system including camera photographing techniques and film development techniques for forming films with a finished base portion density ranging from 0.8 to 1.2 has generally been established to provide laboratory services improved in terms of commercial value. However, if a microfilm is used for a long time or exposed for a long time in some maintenance/handling processes, or if a master microfilm having photographed images is used to obtain to duplicate films, the transmission density of the original microfilm is changed (it usually tends to decrease). An arrangement for enabling user operation in such a case is therefore desirable. There is therefore a problem of density control operability and image reproducibility with respect to the image output operation of outputting an enlarged film image to a printer.

In FIG. 13, the region (3)–(4) corresponding to a film density range of 1.0 to 1.2, the region (4)–(5) is set to cover a film density range of 1.2 to about 1.4, and the region (5)–(6) is set to cover a film density range of 1.4 or higher. The region (2)–(3) is set in correspondence with a film density range of 0.8 to 1.0, and the region (1)–(2) is set in correspondence with a film density range of 0.6 to 0.8. Printing images with fidelity in a film density range of 0.6 to 1.4 is thereby enabled while considering ease of density adjustment.

This embodiment has the same effects as the second embodiment. It is also arranged to obtain gamma correction curves further improved in reproduction fidelity and in adaptability for user's preference, and to achieve high gradation performance and high reproducibility even if the density of the film varies as described above.

In the above-described embodiments, image processing is performed by interposing the density correction circuit 4 between the edge enhancement circuit 5 and A/D converter 3. To enhance the edge level and to improve image sharpness while further increasing the degree of fidelity, a gamma correction circuit may be provided for operation after edge enhancement.

The error diffusion method has been described as an example of a pseudo half-tone processing method, but this is not exclusive. Any method can be used so long as a gradation effect can be achieved.

As described above, in a digital reader printer, optimum δ curves are selected for any of negative and positive films and the quantity of light from the light source is changed according to the selected curves. It is thereby possible to easily obtain a copy having an improved gradation effect from a negative or positive film. Further, a photographic image and a character image can be discriminated from each other to form an image according to the δ characteristic of the original image. It is therefore possible to obtain a high-gradation printed image from a high-δ photographic microfilm.

A laser printer as disclosed in U.S. Pat. No. 4,700,237 may be provided as the printer to obtain a copy from the disclosed image reader, or a different type of printer may be used. The gamma correction circuit need not comprises a look-up table embodied in ROM, PROM, EPROM, etc. but could equally comprise a processor (e.g. an MPU) operating in accordance with a stored algorithm. The light level signal EN/EP could be provided by a different ROM or a processor, in dependence on the same image control signals. The means for supplying the image processing control signals SEL, N/P and character/photograph could be an automatic control circuit for judging an appropriate signal value, additionally or alternatively to the user control panel 12.

The invention could be used to read paper originals, for example, as well as film.

While the present invention has been described with respect to what presently are considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image reader comprising:

a light source for illuminating an original image by a controllable quantity of light;

read means for reading the original image illuminated by said light source to provide an image signal;

density conversion means for density-converting the image signal in accordance with a density conversion characteristic;

setting means for setting a desired image density;

storing means for storing a plurality of sets of image density control data, each of which includes at least density conversion data and light quantity data;

density control means for controlling the density conversion characteristic of said density conversion means in accordance with the density conversion data in a selected one of the plurality of sets of image density control data stored in said storing means, the selected set of image density control data being selected in accordance with the desired image density set by said setting means; and light control means for controlling the quantity of light of said light source in accordance with the light quantity data in the selected set of image density control data.

2. An image reader according to claim 1, wherein said read means reads an original image recorded on a transparent medium.

3. An image reader according to claim 2, wherein the transparent medium is a film.

4. An image reader according to claim 1, wherein said setting means sets a desired one of a plurality of predetermined image densities.

5. An image reader according to claim 4, wherein said setting means comprises user operable designation means for designating a desired image density.

6. An image reader according to claim 1, wherein said density conversion means comprises look-up table means for inputting the image signal from said read means and outputting the density converted image signal.

7. An image reader according to claim 1, further comprising instruction means for instructing whether the original image is a positive image or a negative image.

8. An image reader according to claim 7, wherein said storing means stores a plurality of sets of image density control data for the positive image and a plurality of sets of image density control data for the negative image, and wherein the selected set of image density control data is selected in accordance with the instruction from said instructing means.

9. A method for reading an image comprising:

storing a plurality of sets of image density control data, each set of image density control data including at least density conversion data and light quantity data;

setting a desired image density;

selecting one set of the plurality of sets of image density control data in accordance with the desired image density set in said setting step;

a first controlling step for controlling a quantity of light of a light source in accordance with the light quantity data in the selected set of image density control data;

a second controlling step for controlling the density conversion characteristic of density conversion means in accordance with the density conversion data in the selected set of image density control data;

illuminating an original image with a light source which emits a quantity of light controlled in accordance with said first controlling step;

reading the original image illuminated by the light source to provide an image signal; and density-converting the image signal in accordance with the density conversion characteristic controlled in said second controlling step.

10. A method according to claim 9, wherein in said reading step, an original image recorded on transparent medium is read.

11. A method according to claim 10, wherein the transparent medium is a film.

12. A method according to claim 9, wherein in said setting step, a desired one of a plurality of predetermined image densities is set.

13. A method according to claim 12, wherein said setting step comprises a user-operable designation for designating a desired image density.

14. A method according to claim 9, wherein said density-converting step comprises the steps of inputting the image signal from said reading step and outputting a density-converted image signal in accordance with a look-up table.

15. A method according to claim 9, further comprising the step of instructing whether the original image is a positive image or a negative image.

16. A method according to claim 15, wherein in said storing step, a plurality of sets of image density control data for the positive image and a plurality of sets of image density control data for the negative image are stored, and wherein the selected set of image density control data is selected in accordance with the instruction in said instructing step.

* * * * *

UNITED STATES PATENT AND TRADEMARK OFFICE
CERTIFICATE OF CORRECTION

PATENT NO. : 5,523,861

DATED : June 4, 1996

INVENTOR(S): Kazuki Tanaka, et al.

It is certified that error appears in the above-identified patent and that said Letters Patent is hereby corrected as shown below:

Title page, item

[56] "5,024,736 4/1993 Abe" should read
--5,204,736 4/1993 Abe--.

COLUMN 5:

Line 31, "indicating. Whether" should read
--indicating whether--.

COLUMN 7:

Line 51, "as" should be deleted.

COLUMN 9:

Line 11, "abelsea" should read --abscissa--.

UNITED STATES PATENT AND TRADEMARK OFFICE
CERTIFICATE OF CORRECTION

PATENT NO. : 5,523,861

DATED : June 4, 1996

INVENTOR(S) : Kazuki Tanaka, et al.

It is certified that error appears in the above-identified patent and that said Letters Patent is hereby corrected as shown below:

COLUMN 12:

Line 31, "comprises" should read --comprise--.

Signed and Sealed this

Twenty-second Day of October, 1996

Attest:

BRUCE LEHMAN

Attesting Officer

Commissioner of Patents and Trademarks